Oct. 13, 1925.
J. RICKER
1,557,090
SAW SWAGE
Filed Sept. 7, 1922
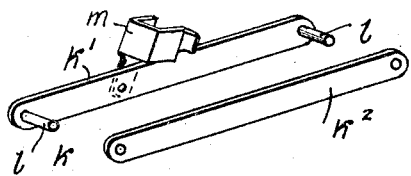
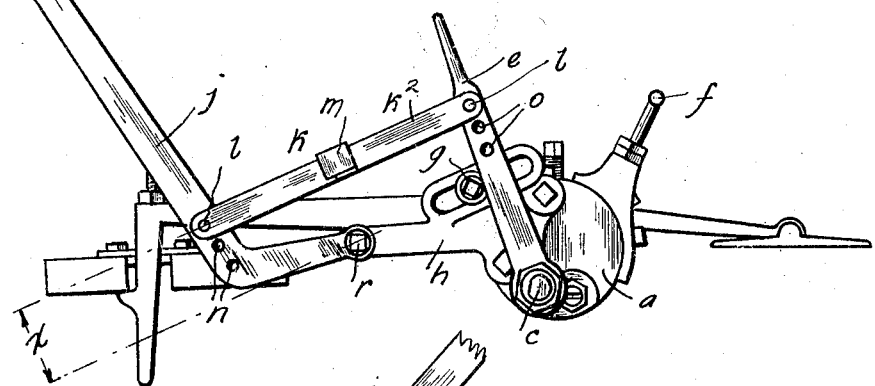
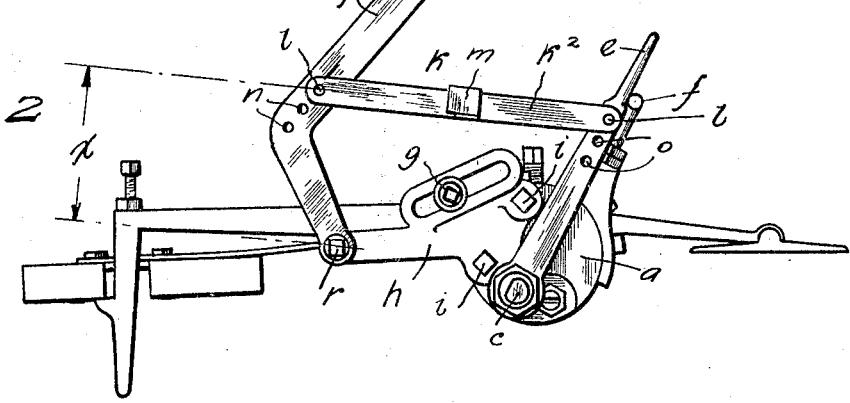
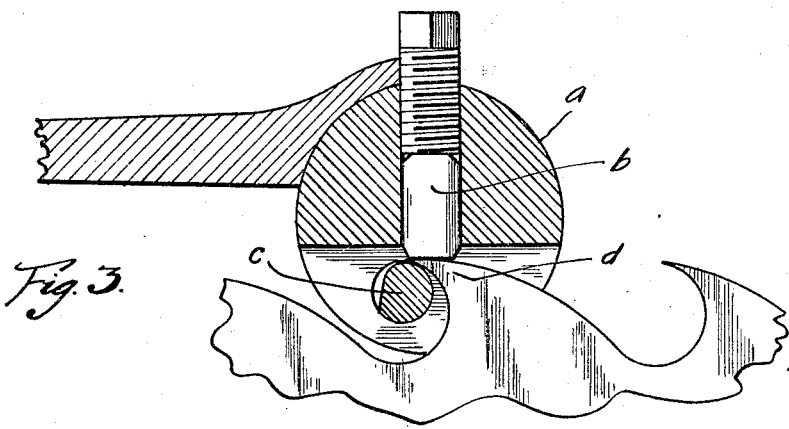
Inventor:
Jerry Ricker
Atty.

Patented Oct. 13, 1925.

1,557,090

UNITED STATES PATENT OFFICE.

JERRY RICKER, OF ENTERPRISE, OREGON.

SAW SWAGE.

Application filed September 7, 1922. Serial No. 586,635.

*To all whom it may concern:*

Be it known that I, JERRY RICKER, a citizen of the United States, and a resident of Enterprise, county of Wallowa, and State of Oregon, have invented new and useful Improvements in a Saw Swage, of which the following is a specification.

My invention relates to saw swaging devices of the type illustrated in the Letters Patent of the United States granted to Edward P. Armstrong and dated Feb. 18, 1908, bearing No. 879,352.

By reference to such patent it will be noted that the device effecting the saw swaging operation comprises an anvil, a rotatable die of eccentric cross-section, and a handle fastened to this die so as to rotate the same. The saw tooth is placed between the anvil and the die, and the swaging of the point of the saw tooth is done by rotating the latter. That is to say, the point of the saw tooth is swaged to the desired degree by the pressure to which it is subjected between the anvil and the eccentric portion of the die. Since a considerable power is necessary to upset the end of the saw tooth, it has been found that it is necesasry to obtain a considerable leverage on the die. Thus the specific object of my invention is to provide a compound lever by which enough power can be applied to the eccentric die so that the swaging operation can be effected easily.

A further object is to provide a lever the power of which is applied in varying degrees, the maximum power being applied when the rotatable die is in its maximum position, or in other words, when the rotatable die is swaging the saw tooth the maximum amount of power can be obtained thru this series of levers.

I have shown the construction and operation of my improvement in the accompanying drawings, in which:

Fig. 1 is a side elevation of a saw swage with my improved compound lever attached to a stub handle in place of the ordinary handle and shows the lever in operating position;

Fig. 2 is a similar side elevation and shows the lever in inoperative position;

Fig. 3 is a section taken thru the swage with the rotary die and anvil in position; and Fig. 4 is a perspective view showing the connecting links which connect my operating lever to the stub lever and shows how they can be removed one from the other.

The saw swage which I have shown is one of the standard models of saw swages and the devices which effect the saw swaging operation comprise a swage head $a$ in which is mounted an anvil $b$ and a rotatable die of eccentric cross-section $c$. The tooth $d$ is placed between the anvil and the die and the swaging of the point of the saw tooth is done by the latter. The point of the saw tooth is swaged to the desired degree by pressure to which it is subjected between the anvil and the eccentric portion of the die.

In these types of saw swages the rotatable die has a handle mounted on it by which to effect the rotation which in my invention has been replaced by the stub handle $e$. Stops are provided to limit the angular movement of this handle. The handle is prevented from moving further in inoperative position by the arm $f$, and further in operative position by the stop $g$. A bracket $h$ is fastened to the swage head $a$ by means of bolts $i$. The L-shaped lever $j$ is pivotally mounted to this bracket and is connected to the stub lever $e$ by means of removable links $k$. These links are made up of two halves, the half $k'$ having pins $l$ fixed thereto and the half $k^2$ having holes thru which these pins can seat. A keeper $m$ is mounted to the link $k'$ and is adapted to hold the link $k$ on the pins $l$. The pins $l$ can be mounted thru any one of the holes $n$ on the L-shaped lever $j$ or the holes $o$ on the stub handle $e$ so that any lever ratio can be obtained between the L-shaped lever and the stub lever. A grip $p$ is fastened to the L-shaped lever $j$ so that the operator may grasp the handle conveniently.

The operation is as follows: As can be noted in Fig. 2, when the swage is placed in inoperative position the length of the lever shown as $x$ between the pin $l$ and the pin $r$ on which the L-shaped lever is mounted to the bracket $h$ is relatively large, but when the lever is placed in operative position at the limit of its stroke as in Fig. 1, shown also as $x$, the length of the lever is relatively small and thus it follows that as the degree of eccentricity of the rotatable die $c$ lessens and therefore the pressure on the tooth increases, the proportion of effective leverage on the handle $j$ increases relatively. In the beginning of the action of the lever it is not necessary that a great pressure be brought to bear on the saw tooth, but as the rotatable die moves closer to the anvil the saw tooth is swaged proportionately greater and thus the degree of power necessary to rotate the die must be also increased. This I have accomplished by my compound lever.

The holes thru which I have placed my link at present show the least leverage possible to be obtained thru my lever *j* and show the greatest arc of movement. If the link is placed in the lower holes the effective leverage will, of course, be increased and the arc thru which the stub lever *e* moves will be relatively lessened.

I claim:

1. In a saw swage of the character described, a head carrying a fixed anvil and a rotatable die co-acting therewith, an arm carried by the die, a bracket provided on the head, an L-shaped lever provided with a long arm and a short arm, the extremity of the latter pivoted to said bracket, a link connecting the long arm of said L-shaped lever adjacent the juncture of the short arm of the latter, with the arm of said die, said link being adjustable so as to vary the force transmitted by said L-shaped lever to said die arm, the devices being adapted to form a compound lever.

2. In a saw swage of the character described, a fixed anvil and a rotatable die co-acting therewith, a crank arm fixed on the rotatable die, an operating lever operatively connected with the crank arm, the operating lever being pivoted so as to have a relatively increasing mechanical advantage as it moves from the beginning of its operating stroke to its end, thereby causing the movement of the operating lever in one direction to rotate the crank arm upon relatively fixed pivots with increasing power but diminishing rate.

3. In a saw swage of the character described, a head carrying a fixed anvil and a rotatable die co-acting therewith, an arm carried by the die, a lever pivotally connected to said head, and a link connecting said operating lever and said arm, said operating lever being pivoted so as to have relatively increasing mechanical advantage as it moves from the beginning of its operating stroke to its end thereby adapted to move said link laterally proportionately less for each degree of rotation thereof, at the end of its power applying movement than at the beginning thereof, thereby to increase the leverage to permit a greater force to be applied by the die.

4. In a saw swage of the character described, a head carrying a fixed anvil and a rotatable die co-acting therewith, an arm carried by the die, an L-shaped lever pivotally connected to said head, and a link connecting said operating lever and said arm, said operating lever being pivoted so as to have relatively increasing mechanical advantage as it moves from the beginning of its operating stroke to its end thereby adapted to move said link laterally proportionately less for each degree of rotation thereof, at the end of its power applying movement than at the beginning thereof, thereby to increase the leverage to permit a greater force to be applied by the die.

5. In a saw swage of the character described, a head carrying a fixed anvil and a rotatable die co-acting therewith, an arm carried by the die, an L-shaped lever provided with a long arm and a short arm, the extremity of the latter pivoted to said head, a link connecting the long arm of said L-shaped lever, adjacent the juncture of the short arm of the latter, with the arm of said die, the devices being adapted to form a compound lever.

6. In a saw swage of the character described, a head carrying a fixed anvil and a rotatable die co-acting therewith, an arm carried by the die, a bracket provided on the head, an L-shaped lever provided with a long arm and a short arm, the extremity of the latter pivoted to said bracket, a link connecting the long arm of said L-shaped lever, adjacent the juncture of the short arm of the latter, with the arm of said die, the devices being adapted to form a compound lever.

JERRY RICKER.